(12) United States Patent
Yamamoto et al.

(10) Patent No.: US 6,814,858 B2
(45) Date of Patent: Nov. 9, 2004

(54) WATER TREATMENT SYSTEM (75) Inventors: Kazuhiro Yamamoto, Kasai (JP); Minoru Kishi, Kusatsu (JP); Yoshihiro Inamoto, Otsu (JP); Tatsuya Hirota, Kyoto (JP); Tamotsu Kawamura, Yokaichi (JP); Takuya Noro, Kusatsu (JP)

(73) Assignee: Sanyo Electric Co., Ltd., Osaka (JP)

( * ) Notice: Subject to any disclaimer, the term of this patent is extended or adjusted under 35 U.S.C. 154(b) by 163 days.

(21) Appl. No.: 10/153,853

(22) Filed: May 24, 2002

(65) Prior Publication Data

US 2003/0029808 A1 Feb. 13, 2003

(30) Foreign Application Priority Data

May 28, 2001 (JP) ........................................ 2001-158902

(51) Int. Cl.[7] ................................................ C02F 1/461
(52) U.S. Cl. ...................... 210/169; 210/192; 210/194; 210/243; 204/228.6; 204/237
(58) Field of Search ................................ 210/748, 754, 210/764, 96.1, 169, 192, 194, 198.1, 205, 243; 204/237, 228.1, 228.6, 275.1

(56) References Cited

U.S. PATENT DOCUMENTS

| | | | | | |
|---|---|---|---|---|---|
| 4,033,871 A | * | 7/1977 | Wall | .......................... | 210/96.1 |
| 4,381,240 A | * | 4/1983 | Russell | ....................... | 210/746 |
| 4,701,265 A | * | 10/1987 | Carlsson et al. | ............ | 210/744 |
| 4,767,511 A | * | 8/1988 | Aragon | ....................... | 210/743 |
| 4,808,290 A | * | 2/1989 | Hilbig | ....................... | 204/228.2 |
| 5,366,605 A | * | 11/1994 | Wang | .......................... | 210/96.2 |
| 5,985,155 A | * | 11/1999 | Maitland | .................... | 210/739 |
| 6,096,202 A | * | 8/2000 | Fulmer | ....................... | 210/167 |
| 6,627,053 B2 | * | 9/2003 | Hirota et al. | ............. | 204/228.1 |
| 6,627,073 B2 | * | 9/2003 | Hirota et al. | ................ | 210/169 |

FOREIGN PATENT DOCUMENTS

| | | |
|---|---|---|
| EP | 0 155 479 A | 9/1985 |
| EP | 0 343 092 A | 11/1989 |
| EP | 1 074 515 A | 2/2001 |
| EP | 1 108 683 | 6/2001 |
| GB | 1 435 503 | 5/1976 |

* cited by examiner

Primary Examiner—Frank M. Lawrence
(74) Attorney, Agent, or Firm—Rabin & Berdo, P.C.

(57) ABSTRACT

In accordance with the present invention, there is provided a water treatment system for sterilizing water retained in a water container. The system includes a circulation process line for pumping the to-be-sterilized water out of the water container, sterilizing the water through electrolysis, and feeding the sterilized water back into the water container; an arrangement for producing a sterilizing solution having a sterilizing function by electrolyzing an electrolytic solution containing chlorine ions and having a function of promoting an electrochemical reaction; and an arrangement for supplying the produced sterilizing solution into the circulation process line as required. The system can constantly sterilize the water in the circulation process line and, as required, additionally supply the sterilizing solution produced by the sterilizing solution producing arrangement into the circulation process line according to a variation in the quality of the water.

5 Claims, 6 Drawing Sheets

WATER TREATMENT SYSTEM

This application is based on an application No. 2001-158902 filed in Japan, the contents of which are incorporated hereinto by reference.

BACKGROUND OF THE INVENTION

1. Field of the Invention

The present invention relates to a novel water treatment system which is capable of sterilizing water contained in various types of water containers ranging from large-scale water containers such as swimming pools and bathing pools in bathhouses to medium-scale water containers such as water supply tanks on building rooftops and small-scale water containers such as bathtubs for general domestic use.

2. Description of Related Art

To maintain the quality of water in indoor and outdoor swimming pools, for example, the water is periodically sterilized by adding so-called chlorinated lime (bleaching powder or high-concentration bleaching powder) or an aqueous solution of sodium hypochlorite (NaClO) to the water in the pools.

Conventionally, the sterilizing operation is manually performed by pool workers. In addition, the chlorinated lime and the sodium hypochlorite aqueous solution are irritating, so that the sterilizing operation should be performed after business hours. Thus, greater efforts are required for the sterilizing operation.

Furthermore, the chlorinated lime is in a solid powdery form, so that it takes some time for homogeneous dissolution of the chlorinated lime after the addition thereof. During this period, the swimming pool is not available.

The inventor of the present invention previously invented a water treatment system which has a water treatment line for introducing to-be-sterilized water into an electrolysis chamber from a water container, sterilizing the water by way of an electrochemical reaction, and feeding the water back into the water container.

In the water treatment system according to the preceding invention, the to-be-sterilized water is supplied into the electrolysis chamber having electrodes, and subjected to the electrochemical reaction (so-called electrolysis). At this time, chlorine gas, hypochlorous acid (HClO) and hypochlorite ions are generated by the electrochemical reaction, and dissolved in the water for the sterilization of the water.

In the case of the swimming pool, however, the water quality tends to significantly vary depending on the number of swimmers, weather and atmospheric temperature. Where the number of swimmers sharply increases to result in rapid deterioration of the water quality, for example, the electrolysis in the electrolysis chamber alone does not suffice for the sterilization. In this case, the sterilization operation is performed by manually adding an agent to the water as well as by performing the electrolysis. This results not only in an increase in burden on the workers but also in unstable water quality.

The present invention is intended to solve the aforesaid problems, and it is therefore an object of the invention to provide a novel water treatment system which is capable of easily and efficiently performing a sterilization operation to properly maintain the water quality.

SUMMARY OF THE INVENTION

In accordance with the present invention, there is provided a water treatment system for sterilizing water retained in a water container, the system comprising: a circulation process line for pumping the to-be-sterilized water out of the water container, sterilizing the water through electrolysis, and feeding the sterilized water back into the water container; means for producing a sterilizing solution having a sterilizing function by electrolyzing an electrolytic solution containing chlorine ions and having a function of promoting an electrochemical reaction; and means for supplying the produced sterilizing solution into the circulation process line as required.

The system can constantly sterilize the water in the circulation process line and, as required, additionally supply the sterilizing solution produced by the sterilizing solution producing means into the circulation process line according to a variation in the quality of the water. Thus, the quality of the water in the water container can properly be maintained.

The sterilizing solution preliminarily produced through the electrolysis of the electrolytic solution by energizing the electrode set in the first electrolysis chamber is stored and, as required, supplied into the water container according to the quality of the to-be-sterilized water. Thus, the amount of the sterilizing solution to be added to the water can promptly be changed according to the quality of the water which varies depending on the number of swimmers, weather and atmospheric temperature. Therefore, where the concentration of the residual chlorine is expected to be reduced by a steep increase in the number of swimmers during business hours of a swimming pool, or by rises in atmospheric temperature and water temperature due to a change in weather, the residual chlorine concentration can be restored as soon as possible to virtually stabilize the water quality. Where the sterilizing solution is not required so much with a smaller number of swimmers, the sterilizing solution preliminarily produced in the first electrolysis chamber is stored so as to be ready to cope with a sudden reduction in the residual chlorine concentration. As a result, the water quality can be adjusted with a sufficient margin of the sterilizing capacity even if the number of swimmers steeply increases.

Since the concentration of the sterilizing solution produced in the electrolysis chamber can be adjusted to a predetermined level by the concentration adjusting means, the treatment capacity of the system can be controlled as desired to increase the efficiency of the electrochemical reaction caused by the electrode set or to adjust the concentration of the sterilizing solution according to the water quality which varies depending on the number of swimmers, the weather, the ambient temperature and the like.

Figure 1:
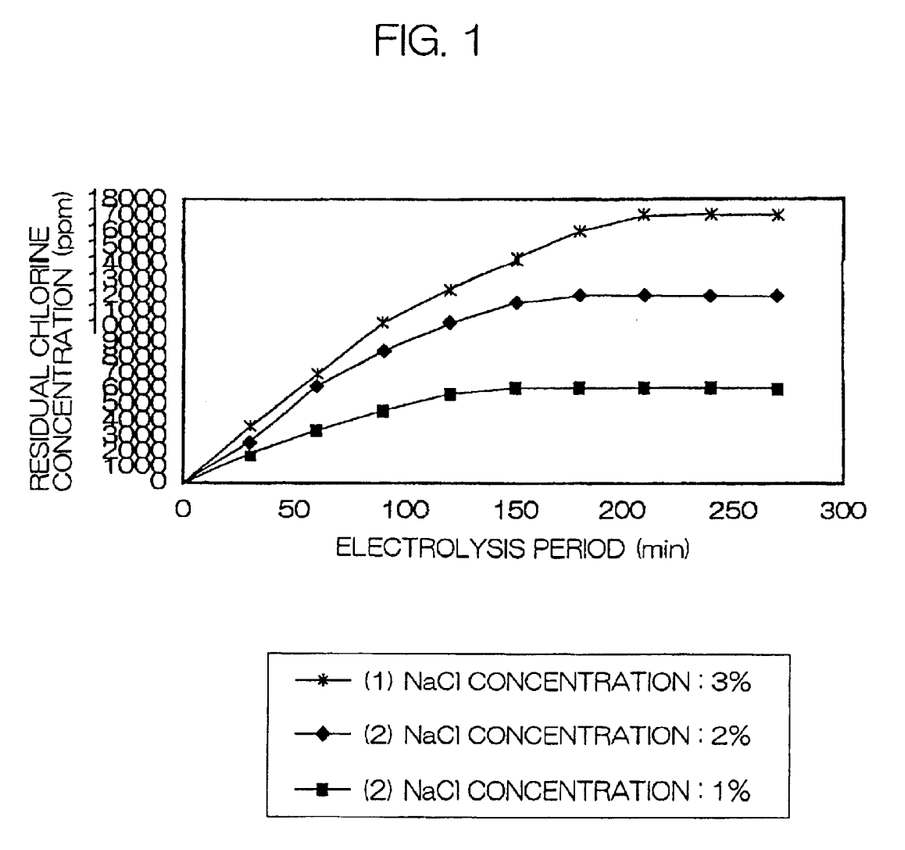
FIG. 1 is a graph showing a relationship between the concentration of residual chlorine and an electrolysis period.

The control of the concentration of the sterilizing solution can be achieved by adjusting the concentration of the electrolytic solution retained in the first electrolysis chamber. That is, the concentration of the sterilizing solution produced by the energization of the electrode set is proportional to the concentration of the electrolytic solution (e.g., salt water) electrolyzed by the electrode set. FIG. 1 is a graph in which an electrolysis period (mm) is plotted as abscissa and a residual chlorine concentration (ppm) of the sterilizing solution produced by the electrolysis is plotted as ordinate. In this graph, there are shown the results of the electrolysis of three kinds of salt water respectively having NaCl concentrations of 1%, 2% and 3%. In the case of the salt water having an NaCl concentration of 1%, the residual chlorine concentration increases with the electrolysis period until the electrolysis period reaches 150 minutes, and is then saturated. In the case of the salt water having an NaCl concentration of 2%, the residual chlorine concentration increases with the electrolysis period until the electrolysis period reaches 180 minutes, and is then saturated. In the case of the salt water having an NaCl concentration of 3%, the residual chlorine concentration increases with the electrolysis period until the electrolysis period reaches 220 minutes, and is then saturated.

Thus, the residual chlorine concentration or the concentration of the sterilizing solution increases with the electrolysis period to a predetermined level corresponding to the concentration of the electrolytic solution retained in the first electrolysis chamber, and is then saturated.

Therefore, the concentration of the sterilizing solution produced through the electrolysis by the electrode set can be controlled by adjusting the concentration of the electrolytic solution if the electrolysis period is not shorter than a predetermined period (required for the saturation).

When a user specifies the concentration of the sterilizing solution, for example, the concentration of the electrolytic solution to be supplied into the electrolysis chamber is adjusted to a level corresponding to the specified concentration of the sterilizing solution. As a result, the concentration of the sterilizing solution produced through the electrolysis by the electrode set is automatically controlled at a level corresponding to the concentration of the supplied electrolytic solution. Therefore, if the user is allowed to set the concentration of the sterilizing solution, the residual chlorine concentration of the water can be adjusted at a desired level according to the type of the water container or the application of the water treatment system. Thus, the water treatment system is applicable to various types of water containers.

A high-concentration electrolytic solution such as saturated salt water is preliminarily stored in a tank, and the amount of the high-concentration electrolytic solution supplied into the first electrolysis chamber from the tank and the amount of a diluent (e.g., tap water) employed for dilution of the high-concentration electrolytic solution are controlled so as to adjust the concentration of the electrolytic solution in the first electrolysis chamber to a specified level.

The system further comprises a flow path for introducing the to-be-sterilized water into the first electrolysis chamber from the water container, whereby the water is supplied from the water container through the flow path to the high-concentration electrolytic solution supplied into the first electrolysis chamber from the tank so that the high-concentration electrolytic solution retained in the electrolysis chamber is diluted with the water. Thus, the concentration of the electrolytic solution can be adjusted to the specified level.

The concentration of the sterilizing solution produced in the electrolysis chamber is controlled by adjusting the quantity of electricity supplied to the electrode set, i.e., the level of an electric current (charge amount) applied for the electrolysis.

Figure 2A:
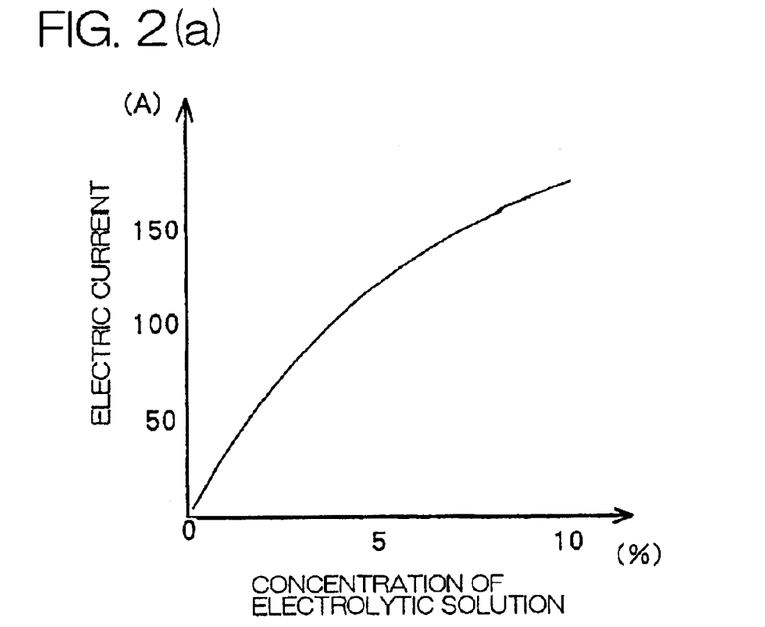
FIGS. 2(a) and 2(b) are graphs showing a relationship between the utilization efficiency of an electrolyte and the concentration of an electrolytic solution.
Figure 2B:
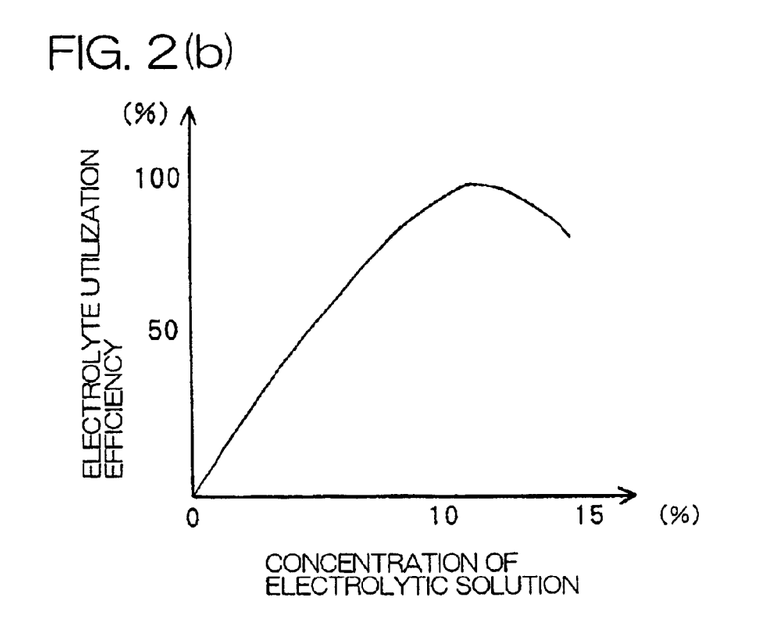

By detecting the level of the electric current flowing through the electrode set, utilization efficiency at which an electrolyte in the electrolytic solution is utilized by the electrode set can accurately be judged. More specifically, where a constant DC voltage is applied between the electrodes, the level of the electric current flowing between the electrodes generally increases as the concentration of the electrolytic solution supplied into the electrolysis chamber is increased, as shown in FIG. 2(a). On the other hand, the amount of the electrolyte (salt) consumed by the electrode set increases as the concentration of the electrolytic solution is increased, as shown in FIG. 2(b). However, the consumption of the electrolyte starts decreasing at a certain concentration level of the electrolytic solution. Therefore, an experiment is preliminarily performed to obtain data to confirm these relationships and, on the basis of the level of the electric current flowing through the electrode set, the concentration of the electrolytic solution is determined which ensures the highest utilization efficiency of the electrolyte in the electrolysis and maximizes the concentration of the sterilizing solution.

Thus, an increase in the NaCl concentration of the water in a swimming pool (water container) can be prevented, which may otherwise occur when the high-concentration electrolytic solution is supplied in excess into the electrolysis chamber and a portion of the electrolytic solution not used for the electrolysis flows into the swimming pool. Therefore, swimmers will not feel uncomfortable in salty water in the swimming pool. Further, an increase in time required for the electrolysis and a reduction in residual chlorine concentration can be prevented, which may otherwise occur due to an excessively low concentration of the electrolytic solution and require a greater amount of the sterilizing solution.

A higher sterilizing effect can also be provided. More specifically, the sterilizing effect of the sterilizing solution is expressed by a product Ct of the sterilizing solution concentration C and a period t during which the sterilizing solution is kept in contact with the to-be-sterilized water.

As compared with a case where the sterilizing solution produced in the first electrolysis chamber is directly supplied into the water container, the Ct value is increased during the passage of the sterilizing solution through the water treatment line where the sterilizing solution produced in the first electrolysis chamber is introduced into the water treatment line at a position upstream of the second electrolysis chamber. Thus, a higher sterilizing effect can be provided. Particularly, where an outlet of the first electrolysis chamber is connected to the second electrolysis chamber, the supplied sterilizing solution can readily be exposed to the atmospheric pressure. Therefore, the construction of the system can be simplified.

A required amount of the sterilizing solution can be supplied as required on the basis of the level of the residual chlorine concentration of the water detected by the residual chlorine concentration sensor.

DESCRIPTION OF PREFERRED EMBODIMENTS

Embodiments of the present invention will hereinafter be described more specifically with reference to the drawings.

Figure 3:
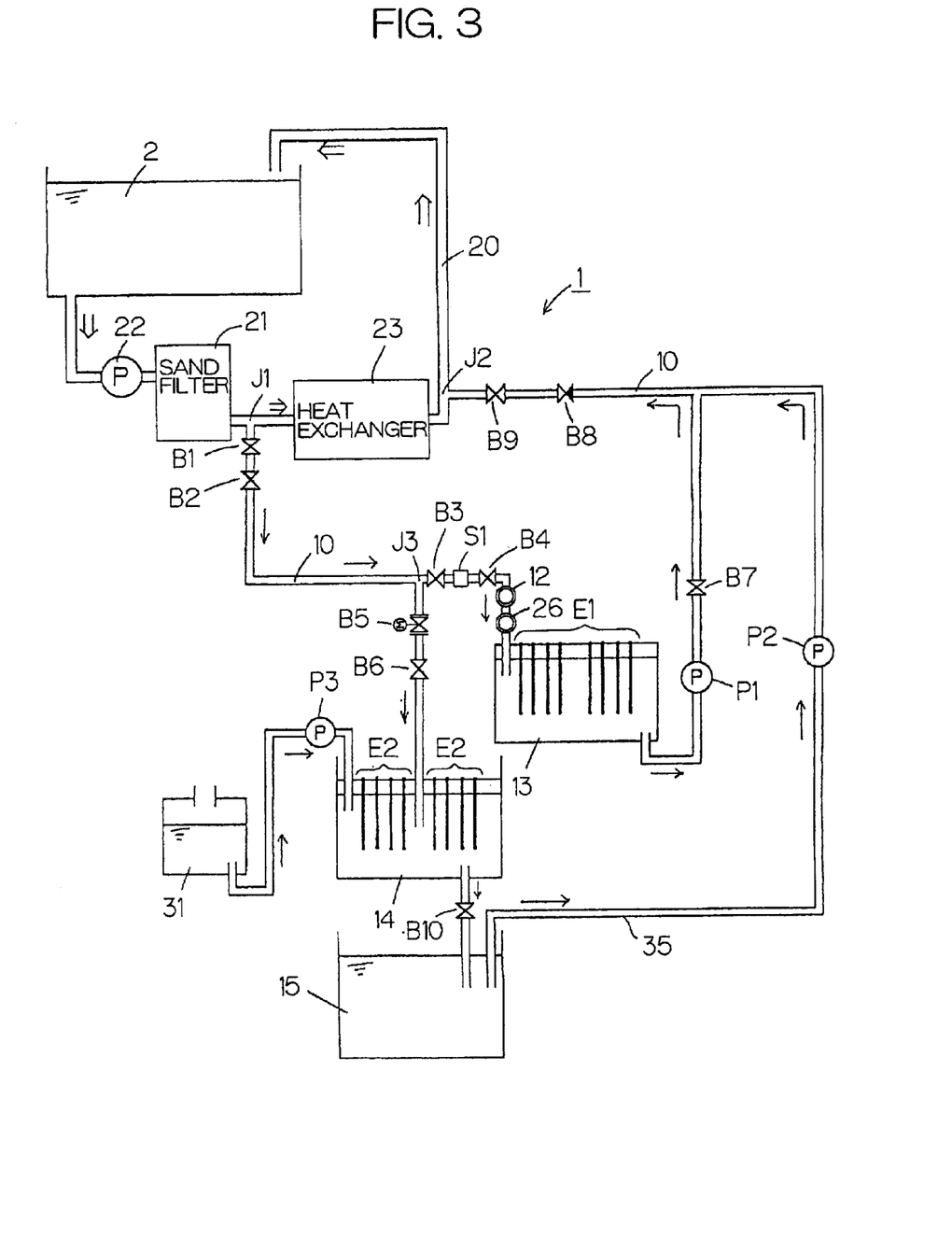
FIG. 3 is a diagram schematically illustrating a water treatment system according to one embodiment of the present invention.

FIG. 3 is a diagram schematically illustrating the construction of a water treatment system 1 incorporated in a large-scale water container 2 such as a swimming pool in accordance with one embodiment of the present invention.

As shown, the water container 2 is provided with a main circulation line 20 for constantly circulating a great amount of to-be-treated water in a direction indicated by a double-line arrow in FIG. 3 by means of a circulation pump 22.

Reference numerals 21 and 23 denote a filter for sand filtration and a heat exchanger, respectively. As indicated by a single-line arrow in FIG. 3, a water treatment line 10 of the water treatment system 1 is diverged from the main circulation line 20 at a branch J1 between the filter 21 and the heat exchanger 23, extends through a circulation process electrolysis chamber 13 (second electrolysis chamber) including a minute bubble removal filter not shown and an electrode set E1 consisting of a plurality of electrode plates, and joins the main circulation line 20 at a junction J2 downstream of the branch J1.

A stop valve B1, regulation valves B2, B3 for flow rate regulation, a flowmeter S1, an electromagnetic valve B4, an electrical conductivity sensor 12 and a residual chlorine sensor 26 for measuring the concentration of residual chlorine are disposed in this order between the branch J1 and the circulation process electrolysis chamber 13 in the water treatment line 10.

A feed pump P1 for feeding the water out of the circulation process electrolysis chamber 13 to circulate the water in the water treatment line 10, a regulation valve B7, a check valve B8 for prevention of back flow, and a regulation valve B9 for flow rate regulation are disposed in this order between the circulation process electrolysis chamber 13 and the junction J2 in the water treatment line 10.

The water treatment system 1 having the aforesaid construction operates in the following manner. The water in the water container 2 is pumped out by the circulation pump 22, and organic substances are removed from the water by the filter 21. The water is diverged at the branch J1, so that a part of the water is circulated through the heat exchanger 23 to be fed back into the water container 2 and the other part of the water is introduced into the water treatment line 10. The flow rate of the water introduced into the water treatment line 10 is regulated by the stop valve B1 and the regulation valves B2, B3, passes through the flow rate meter S1 and the electromagnetic valve B4, and is introduced into the circulation process electrolysis chamber 13 through the electrical conductivity sensor 12 and the residual chlorine sensor 26. The electrical conductivity sensor 12 measures the electrical conductivity (electrical conductance) of the water to be introduced into the circulation process electrolysis chamber 13. The residual chlorine sensor 26 measures the concentration of residual chlorine in the water.

In the circulation process electrolysis chamber 13, the water is electrolyzed by energizing the electrode set E1 with a direct electric current. In the electrolysis, an electrochemical reaction occurs between the electrodes of the electrode set E1, whereby hypochlorite ions, chlorine gas, hypochlorous acid and active oxygen are generated which are utilized for sterilization of the water.

The water sterilized in the circulation process electrolysis chamber 13 is pumped out by the circulation pump P1, passes through the regulation valve B7, the check valve B8 and the regulation valve B9, and is introduced into the main circulation line 20 at the junction J2 and then into the water container 2. Thus, the water in the water container 2 is sterilized.

As shown in FIG. 3, a batch process electrolysis chamber 14 (first electrolysis chamber) which has an electrode set E2 consisting of a plurality of electrode plates is provided in the water treatment line 10.

The batch process electrolysis chamber 14 is filled with an electrolytic solution containing chlorine ions such as afforded by salt and having a function of promoting an electrochemical reaction. In this state, the electrolytic solution is electrolyzed for a certain period by energizing the electrode set E2, whereby a sterilizing solution having a sterilizing function is produced. The water treatment system further includes a reservoir tank 15 for storing the sterilizing solution thus produced, and a feed line 35 for feeding the sterilizing solution from the reservoir tank 15 into the water treatment line 10 as required.

More specifically, the feed line 35 is diverged from the water treatment line 10 at a branch J3 between the regulation valve B2 and the regulation valve B3, extends to the batch process electrolysis chamber 14 via a regulation valve B5 and an electromagnetic valve B6, further extends from the electrolysis chamber 14 to the reservoir tank 15 via an electromagnetic valve B10, and further extends from the reservoir tank 15 via a feed pump P2 to join the water treatment line 10 at a position between the regulation valve B7 and the check valve B8.

A salt water tank 31 storing the electrolytic solution (e.g., saturated salt water) is connected to the batch process electrolysis chamber 14 through a constant flow rate pump P3.

The feed line 35 operates in the following manner.

The constant flow rate pump P3 and the electromagnetic valve B6 are driven, whereby the electrolytic solution which has a predetermined concentration is fed into the batch process electrolysis chamber 14. The level of the electrolytic solution in the batch process electrolysis chamber 14 is maintained at a predetermined level by a water level sensor W1 not shown. The electrolytic solution fed into the batch process electrolysis chamber 14 is electrolyzed for the production of the sterilizing solution containing hypochlorous acid, hypochlorite ions and the like. The sterilizing solution thus produced is accumulated in the reservoir tank 15 with the electromagnetic valve B10 being open. The electromagnetic valve B10 is controlled on the basis of a water level detected by a water level sensor W2 not shown so that the sterilizing solution is accumulated to fill the reservoir tank 15. Then, the sterilizing solution thus accumulated is pumped out by the constant flow rate pump P2 according to the residual chlorine concentration of the water detected by the residual chlorine sensor 26 as required, and fed into the water treatment line 10. Where the sterilization is likely to require much time if being achieved by performing the sterilizing operation in the circulation process electrolysis chamber 13 alone, the sterilizing solution is thus introduced into the water treatment line 10 from the reservoir tank 15 for the sterilization of the water.

Figure 4:
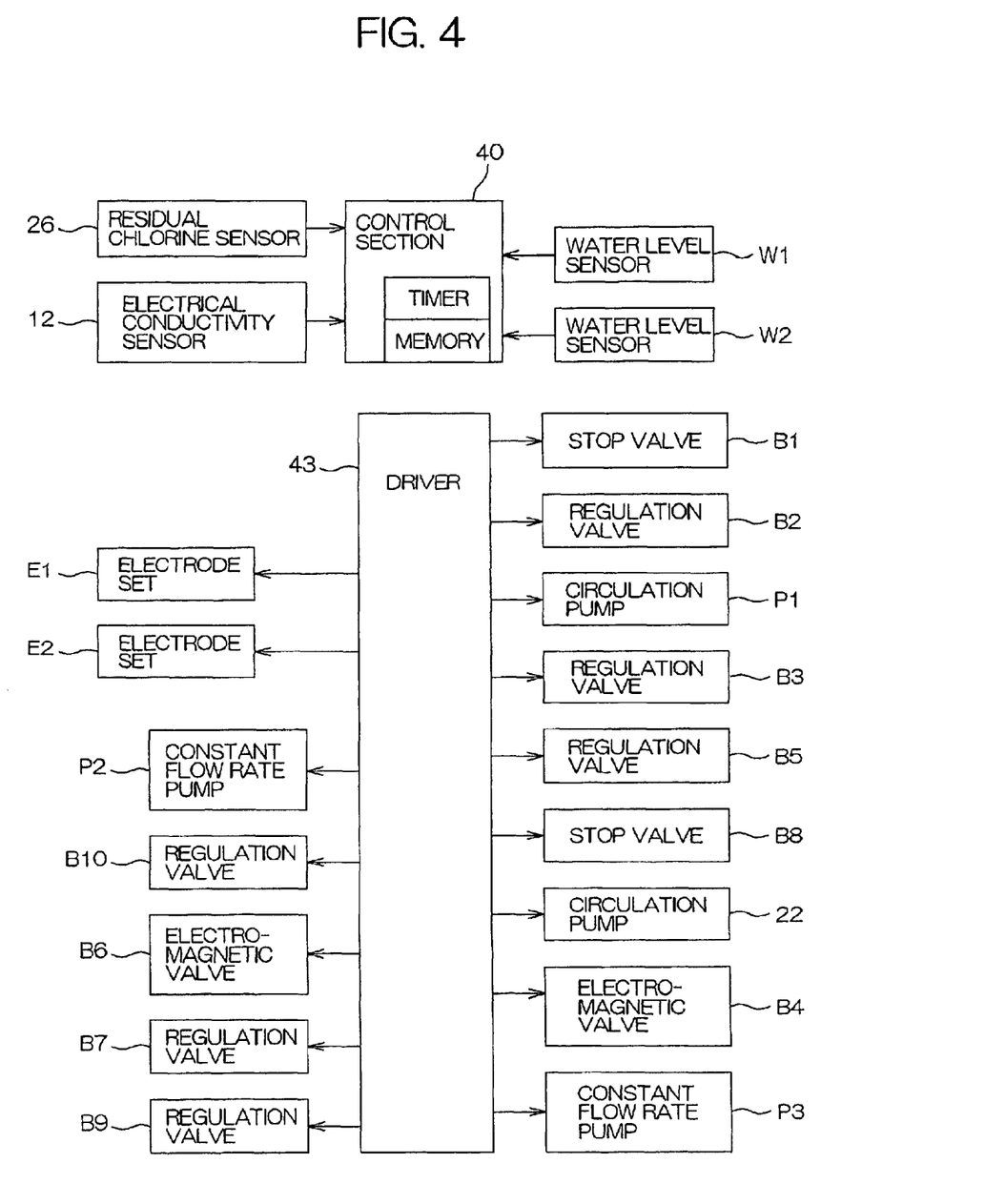
FIG. 4 is a block diagram illustrating the electrical construction of the water treatment system of FIG. 3.

FIG. 4 is a block diagram illustrating the electrical construction of the water treatment system 1 of FIG. 3. The water treatment system includes a control section 40 for controlling the energization of the respective electrode sets E1, E2 and the operations of the respective components of the water treatment line 10 and the feed line 35.

The control section 40 includes a timer for specifying operation timings of the respective components, and a memory storing therein threshold values as reference levels of electricity to be supplied to the electrode sets.

Detection signals of the residual chlorine sensor 26, the electrical conductivity sensor 12 and the water level sensors W1, W2 explained with reference to FIG. 3 are applied to the control section 40.

The control section 40 controls the operation of the water treatment system 1 on the basis of a predetermined operation program according to the detection signals applied thereto. More specifically, the control section 40 applies control signals to a driver 43. On the basis of the applied signals, the driver 43 controls the electric current levels and energization periods for the electrode sets E1, E2, the opening/closing and regulating operations of the respective valves B1 to B10, and the driving of the respective pumps P1 to P3.

Figure 5:
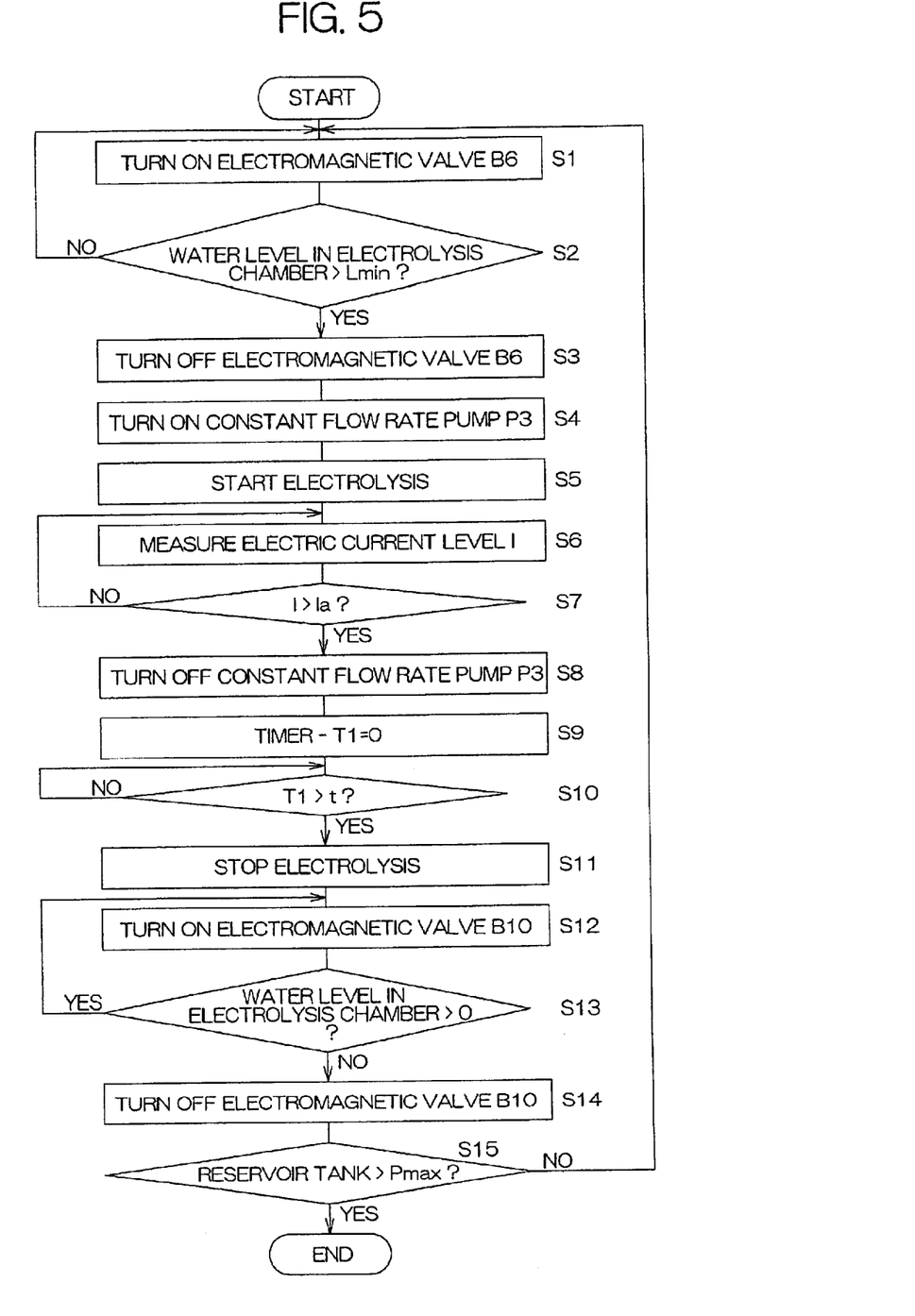
FIG. 5 is a flow chart illustrating the flow of a control process to be performed by a control section, particularly, a process for controlling the concentration of a sterilizing solution produced in a batch process electrolysis chamber.

FIG. 5 is a flow chart illustrating the flow of a control process to be performed by the control section, particularly, a process for controlling the batch process electrolysis chamber 14 and the reservoir tank 15.

A predetermined amount of the sterilizing solution produced in the batch process electrolysis chamber 14 and stored in the reservoir tank 15 is fed into the water container 2 through the water treatment line 10 only when the residual chlorine concentration of the to-be-sterilized water in the water container 2 is lower than a predetermined level. If the residual chlorine concentration is not lower than the predetermined level, the feed pump P2 is inactive on standby.

More specifically, when a power supply to the water treatment system 1 is turned on, the respective components of the water treatment line 10 are actuated and the electromagnetic valve B6 is driven to start supplying the water into the batch process electrolysis chamber 14 (Step S1). The control section 40 first checks if the water level in the batch process electrolysis chamber 14 is at a lower limit water level Lmin on the basis of the detection value of the water level sensor W1 (Step s2).

The water supply is continued until the water level reaches the lower limit water level. When the water level reaches the lower limit water level, the electromagnetic valve B6 is closed to stop the water supply (Step S3).

Then, the constant flow rate pump P3 for feeding the saturated salt water is driven to supply the saturated salt water into the batch process electrolysis chamber 14 from the salt water tank 31. Thus, the saturated salt water thus supplied is diluted with the water previously supplied into the batch process electrolysis chamber 14 for adjustment of the concentration of the electrolytic solution (Step S4).

In turn, a predetermined DC voltage is applied to the electrode set E2 for the electrolysis to start producing the sterilizing solution, and the process goes to Step S6 (Step S5).

In Step S6, the control section determines the level I of an electric current flowing between the electrodes of the electrode set E2, and compares the electric current level I with a threshold value Ia preliminarily stored in the memory for a predetermined concentration level of the sterilizing solution. The control section continuously detects the level of the electric current flowing through the electrode set E2 until the electric current level I reaches the threshold value Ia.

The threshold level Ia is determined by fitting a desired concentration level of the sterilizing solution specified by the user by setting means (not shown) in a relationship between the concentration of the sterilizing solution and the electric current preliminarily determined on the basis of data obtained by experiment.

As soon as the electric current level I reaches the threshold value Ia in Step S7, the constant flow rate pump P3 is stopped to stop the supply of the saturated salt water (Step S8). Then, the timer starts counting, and the electrolysis of the electrolytic solution is continuously performed (Step S9). Thus, the concentration of the sterilizing solution is indirectly determined on the basis of the concentration of the electrolytic solution predicted from the level of the electric current flowing through the electrode set E2. This allows for less costly production of the system.

When the count of the timer reaches a preliminarily stored count value T1, the energization of the electrode set E2 is stopped to stop the electrolysis, and the process goes to Step S12.

In Step S12, the electromagnetic valve B10 is turned on, so that the sterilizing solution produced in the batch process electrolysis chamber 14 is transferred into the reservoir tank 15. When the water level in the batch process electrolysis chamber 14 is reduced to zero, the electromagnetic valve B10 is turned off.

Then, a process sequence from Step S1 to Step S14 is repeated until the sterilizing solution is filled to the full Pmax in the reservoir tank 15.

Although the concentration of the electrolytic solution is adjusted by supplying the saturated salt water from the salt water tank 31 into the water preliminarily retained in the batch process electrolysis chamber in this embodiment, the method for the concentration adjustment is not limited thereto. The adjustment of the concentration of the electrolytic solution may be achieved by preliminarily retaining a predetermined amount of the saturated salt water in the batch process electrolysis chamber 14 and diluting the saturated salt water with the to-be-sterilized water supplied from the water container. The concentration adjustment may be achieved by changing both the amount of the saturated salt water from the salt water tank 31 and the amount of the to-be-sterilized water as the diluent. Thus, the concentration of the electrolytic solution can precisely and promptly be adjusted. Tap water not shown may be employed instead of the to-be-sterilized water as the diluent.

Although the concentration of the sterilizing solution to be produced is adjusted indirectly by adjusting the concentration of the electrolytic solution determined on the basis of the level of the electric current flowing through the electrode set E2, a residual chlorine sensor may additionally be disposed downstream of the batch process electrolysis chamber for directly measuring the concentration of the sterilizing solution produced in the electrolysis chamber, and the concentration of the sterilizing solution may be adjusted on the basis of a concentration level detected by the additional residual chlorine sensor. With this arrangement, the concentration of the sterilizing solution can accurately be controlled since the concentration of the produced sterilizing solution can directly be measured.

Although the concentration of the sterilizing solution to be produced through the electrolysis in the electrolysis chamber 14 is controlled by the concentration of the electrolytic solution supplied into the electrolysis chamber 14 in the aforesaid embodiment, the adjustment of the concentration of the sterilizing solution may be achieved by adjusting the quantity of electricity supplied to the electrode set E2, i.e., the level of the electric current (the amount of charges) supplied for the electrolysis.

Figure 6:
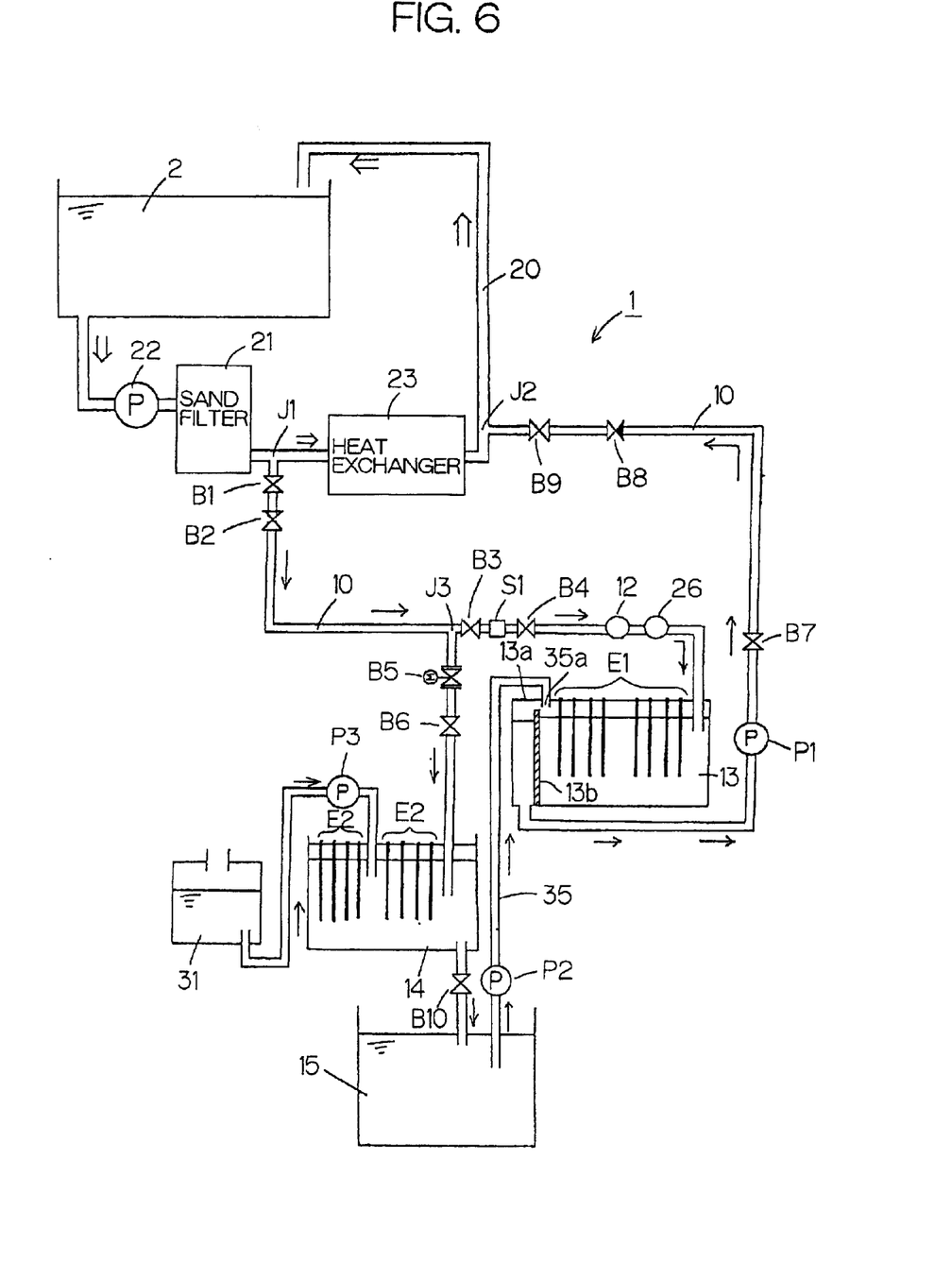
FIG. 6 is a diagram schematically illustrating a water treatment system according to another embodiment of the present invention.

FIG. 6 is a diagram illustrating the construction of a water treatment system 1 according to another embodiment of the present invention.

The water treatment system 1 of FIG. 6 differs from the water treatment system 1 of FIG. 3 in that the sterilizing solution is supplied from the reservoir tank 15 into the circulation process electrolysis chamber 13.

More specifically, an inlet of the latter half of the feed line 35 for supplying the sterilizing solution into the to-be-sterilized water is located at the bottom of the reservoir tank 15 on the downstream side of the reservoir tank 15. The feed line 35 is connected to the circulation process electrolysis chamber 13 at a position downstream of the electrode set and upstream of a gas-liquid separation filter 13b via the feed pump P2 provided in the midst thereof. An outlet 35a of the feed line 35 extends through a cover 13a of the circulation process electrolysis chamber 13, and opens into a space above the water in the electrolysis chamber.

Except for the feed line 35, the water treatment system according to this embodiment has substantially the same construction as the water treatment system according to the preceding embodiment. Therefore, like components disposed in like positions are denoted by like reference characters, and will not be explained.

In this water treatment system 1, the sterilizing solution stored in the reservoir tank 15 is supplied at a constant flow rate in an arrow direction into the circulation process electrolysis chamber 13 by means of the constant flow rate pump P2 according to the residual chlorine concentration of the water for the sterilization of the water.

Since the sterilizing solution produced in the batch process electrolysis chamber 14 is introduced into the circulation process electrolysis chamber 13, the Ct level of the water is increased while the sterilizing solution flows through the circulation process electrolysis chamber 13 and the water treatment line 10. Thus, a higher sterilization effect can be provided. Particularly, where the sterilizing solution is introduced into the circulation process electrolysis chamber 13 on the downstream side of the electrode set E1, reduction in the sterilization effect can be prevented which may otherwise occur due to a reverse reaction caused in the electrolysis of the supplied sterilizing solution by the electrode set E1.

In the aforesaid embodiment, the outlet 35a of the feed line 35 is connected to the circulation process electrolysis chamber 13. However, the feed line 35 may join the water treatment line 10 at any position upstream of the circulation process electrolysis chamber 13. In this case, the Ct level is likewise increased to provide the same effect.

It should be understood that the invention be not limited to the embodiments described above, and various modifications may be made within the scope of the present invention defined by the following claims.

What is claimed is:

1. A water treatment system, comprising:
    a circulation process line for pumping to-be-sterilized water out of a water container, sterilizing the water through electrolysis, and feeding the sterilized water back into the water container;
    a flow path for introducing the water into a first electrolysis chamber from the circulation process line;
    a batch process apparatus, comprising:
        the first electrolysis chamber for electrolyzing liquid retained therein by energizing an electrode set having at least two electrode plates for production of a sterilizing solution having a sterilizing function,
        means for supplying an electrolytic solution into the first electrolysis chamber, the electrolytic solution containing chlorine ions and having a function of promoting an electrochemical reaction, and
        means for adjusting a concentration of the sterilizing solution produced by the first electrolysis chamber, including
            means for adjusting a concentration of the electrolytic solution retained in the first electrolysis chamber, including
                means for adjusting the concentration of the electrolytic solution supplied into the first electrolysis chamber by the means for supplying an electrolytic solution, including
                means for adjusting a ratio of an amount of the electrolytic solution supplied into the first electrolysis chamber by the supplying means to an amount of the water supplied into the first electrolysis chamber through the flow path; and
    means for supplying the sterilizing solution produced by the batch process apparatus into the circulation process line as required.

2. A water treatment system as set forth in claim 1, wherein the means for adjusting the concentration of the sterilizing solution comprises means for controlling a quantity of electricity supplied to the electrode set provided in the first electrolysis chamber.

3. A water treatment system as set forth in claim 2, wherein a second electrolysis chamber for performing an electrolysis by energizing an electrode set having at least two electrode plates is provided in the circulation process line,
    wherein the means for supplying the sterilizing solution into the circulation process line supplies the sterilizing solution into the circulation process line at a position upstream of the second electrolysis chamber.

4. A water treatment system as set forth in claim 1,
    wherein a residual chlorine concentration sensor for measuring a residual chlorine concentration of the water is provided in the circulation process line,
    wherein the means for supplying the sterilizing solution into the circulation process line supplies the sterilizing solution on the basis of a residual chlorine concentration level detected by the residual chlorine concentration sensor.

5. A water treatment system as set forth in claim 1,
    wherein a second electrolysis chamber for performing an electrolysis by energizing an electrode set having at least two electrode plates is provided in the circulation process line,
    wherein the means for supplying the sterilizing solution into the circulation process line supplies the sterilizing solution into the circulation process line at a position upstream of the second electrolysis chamber.

* * * * *